US009117125B2

(12) United States Patent
Demiya

(10) Patent No.: US 9,117,125 B2
(45) Date of Patent: Aug. 25, 2015

(54) ELECTRONIC DEVICE AND HANDWRITTEN DOCUMENT PROCESSING METHOD

(71) Applicant: KABUSHIKI KAISHA TOSHIBA, Minato-ku, Tokyo (JP)

(72) Inventor: Takehiko Demiya, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/965,474

(22) Filed: Aug. 13, 2013

(65) Prior Publication Data

US 2014/0219564 A1  Aug. 7, 2014

Related U.S. Application Data

(63) Continuation of application No. PCT/JP2013/058423, filed on Mar. 22, 2013.

(30) Foreign Application Priority Data

Feb. 7, 2013 (JP) ................................. 2013-022293

(51) Int. Cl.
| | |
|---|---|
| G06K 9/00 | (2006.01) |
| G06K 9/03 | (2006.01) |
| G06F 3/0488 | (2013.01) |
| G06F 17/24 | (2006.01) |
| G06T 1/60 | (2006.01) |

(52) U.S. Cl.
CPC ............. *G06K 9/03* (2013.01); *G06F 3/04883* (2013.01); *G06F 17/242* (2013.01); *G06K 9/00409* (2013.01)

(58) Field of Classification Search
CPC .................................... G06K 9/00; G06F 3/00
USPC ........... 382/179, 186, 187, 189; 345/530, 901
See application file for complete search history.

(56) References Cited

U.S. PATENT DOCUMENTS

| | | | | |
|---|---|---|---|---|
| 7,409,090 | B2 * | 8/2008 | Akiyama | 382/187 |
| 2002/0149630 | A1 * | 10/2002 | Kitainik et al. | 345/863 |
| 2008/0240569 | A1 * | 10/2008 | Tonouchi | 382/186 |

FOREIGN PATENT DOCUMENTS

| | | |
|---|---|---|
| JP | 58-096382 A | 6/1983 |
| JP | 2002-259908 A | 9/2002 |
| JP | 2004-046325 A | 2/2004 |

(Continued)

OTHER PUBLICATIONS

An English Translation of the International Search Report mailed by Japan Patent Office on Apr. 23, 2013 in the corresponding PCT application No. PCT/2013/058423 and Notification (PCT/IB/311)—2 pages.

(Continued)

*Primary Examiner* — Abolfazl Tabatabai
(74) *Attorney, Agent, or Firm* — Knobbe, Martens Olson & Bear LLP

(57) ABSTRACT

According to one embodiment, an electronic device includes a display processor, a transmitter and a receiver. The display processor displays on a screen a handwritten document including a plurality of strokes described by handwriting. The transmitter transmits to a system a handwritten part designated by a select range on the screen. The receiver receives from the system a reshaping result corresponding to the handwritten part. The display processor displays the reshaping result on the screen, the reshaping result and the handwritten part associated with each other.

21 Claims, 14 Drawing Sheets

(56) References Cited

FOREIGN PATENT DOCUMENTS

| | | |
|---|---|---|
| JP | 2010-039769 A | 2/2010 |
| JP | 2012-093866 A | 5/2012 |
| JP | 2012-190296 A | 10/2012 |
| WO | WO 2014/122794 A1 | 8/2014 |

OTHER PUBLICATIONS

International Search Report mailed by Japan Patent Office on Apr. 23, 2013 in the corresponding PCT application No. PCT/JP2013/058423.

* cited by examiner

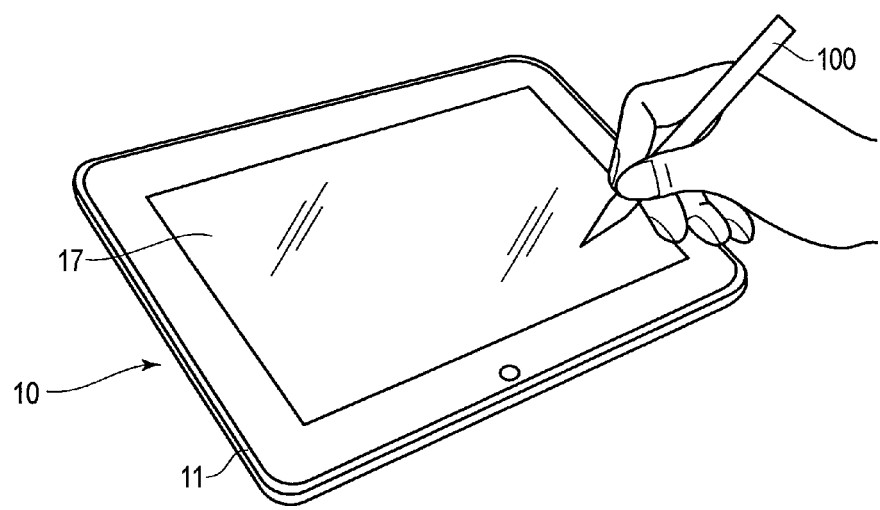
F I G. 1

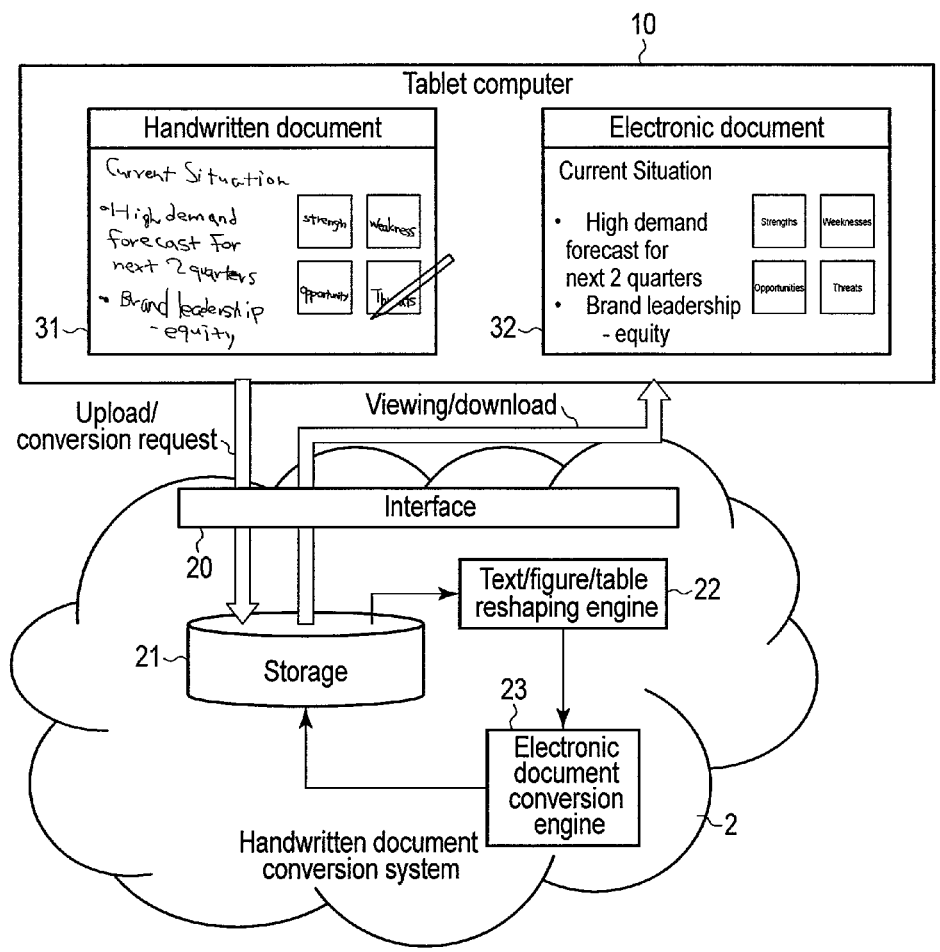
F I G. 2

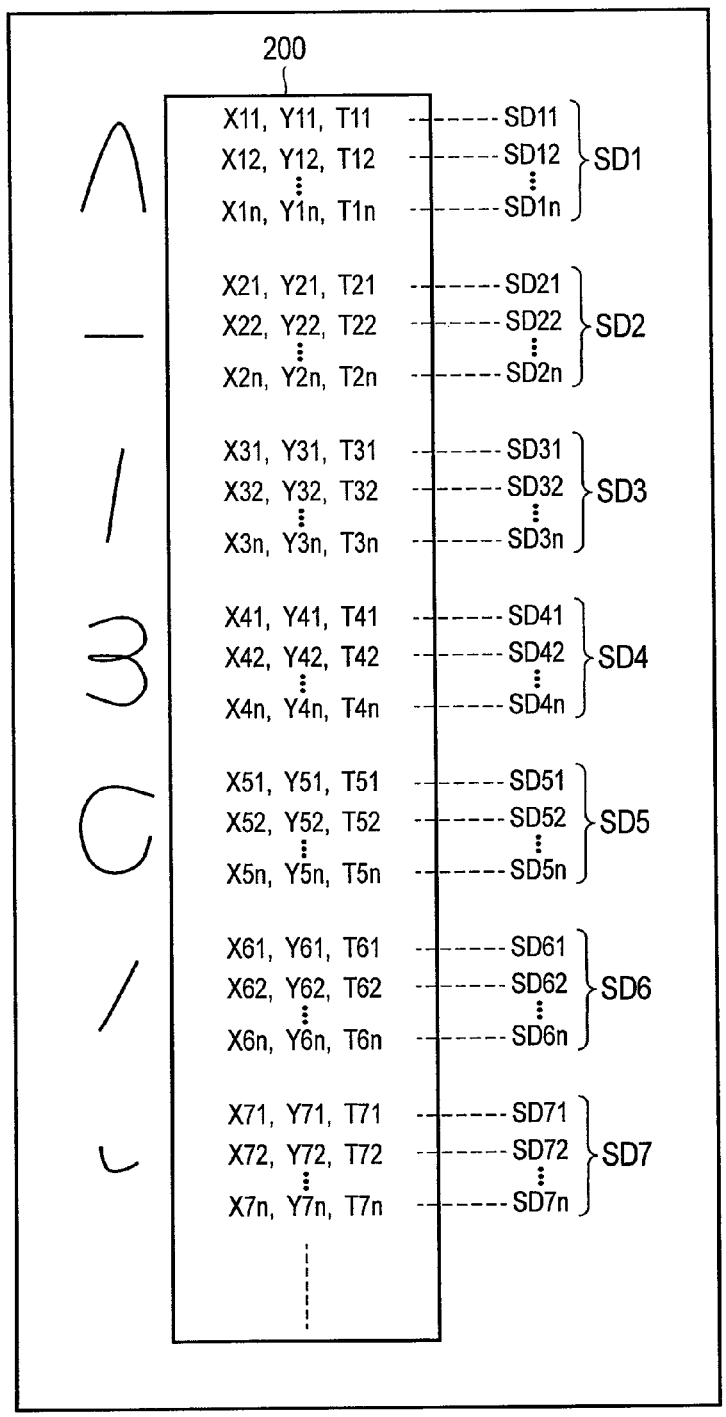
F I G. 4

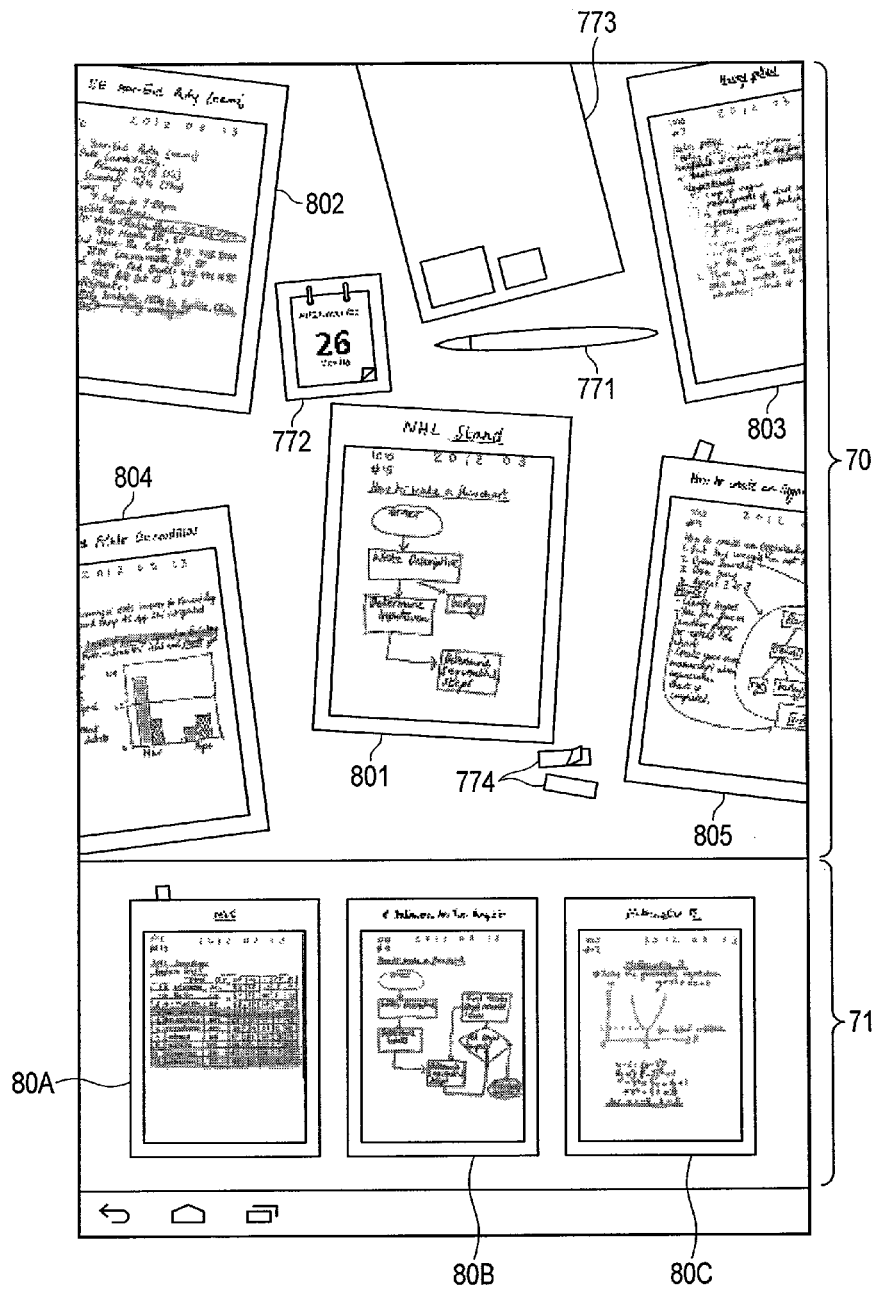
F I G. 6

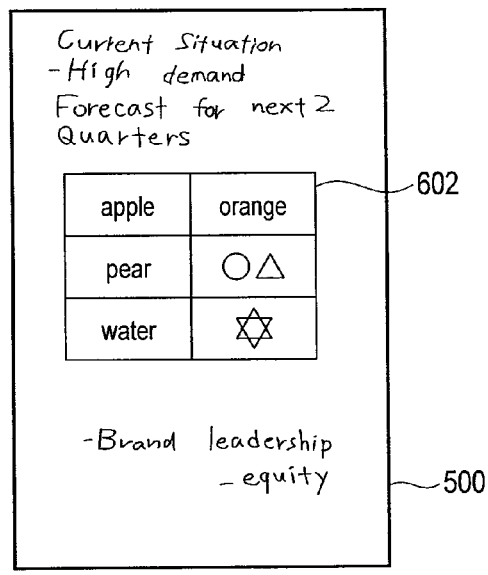
F I G. 12
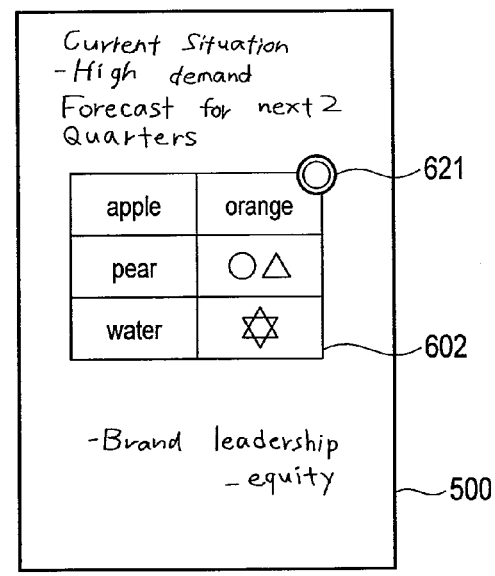
F I G. 13

ELECTRONIC DEVICE AND HANDWRITTEN DOCUMENT PROCESSING METHOD

CROSS REFERENCE TO RELATED APPLICATIONS

This application is a Continuation Application of PCT Application No. PCT/JP2013/058423, filed Mar. 22, 2013 and based upon and claiming the benefit of priority from Japanese Patent Application No. 2013-022293, filed Feb. 7, 2013, the entire contents of all of which are incorporated herein by reference.

FIELD

Embodiments described herein relate generally to a technique of processing a handwritten document.

BACKGROUND

In recent years, various kinds of electronic devices, such as a tablet, a PDA and a smartphone, have been developed. Most of these electronic devices include touch-screen displays for facilitating input operations by users.

By touching a menu or an object, which is displayed on the touch-screen display, by a finger or the like, the user can instruct an electronic device to execute a function which is associated with the menu or object.

However, most of existing electronic devices with touch-screen displays are consumer products which are designed to enhance operability on various media data such as video and music, and are not necessarily suitable for use in a business situation such as a meeting, a business negotiation or product development. Thus, in business situations, paper-based pocket notebooks have still been widely used.

Recently, techniques for character-recognizing handwritten data have also been developed.

Conventionally, however, no consideration has been given to a technique for easily reshaping a desired part in a handwritten document.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view illustrating an external appearance of an electronic device according to an embodiment.

FIG. 2 is a view illustrating a cooperative operation between the electronic device of the embodiment and a handwritten document conversion system.

FIG. 4 is a view for explaining time-series information corresponding to the handwritten document of FIG. 3, the time-series information being stored in a storage medium by the electronic device of the embodiment.

FIG. 6 is a view illustrating a desktop/drawer screen which is displayed by the electronic device of the embodiment.

FIG. 12 is a view illustrating a reshaping result which is displayed in place of a handwritten part by the electronic device of the embodiment.

FIG. 13 is a view for describing a user interface for restoring the reshaping result to the handwritten part, the user interface being displayed on a screen of the electronic device of the embodiment.

DETAILED DESCRIPTION

Figure 3:
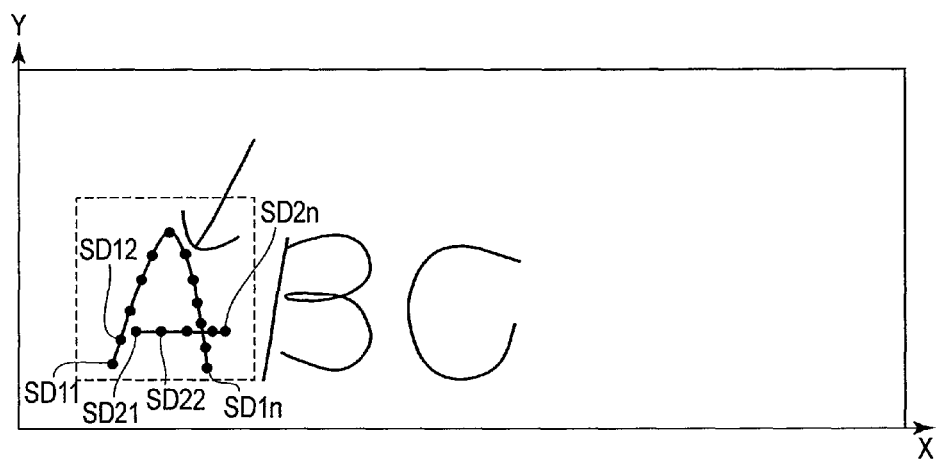
FIG. 3 is a view illustrating an example of a handwritten document which is handwritten on a touch-screen display of the electronic device of the embodiment.

Various embodiments will be described hereinafter with reference to the accompanying drawings.

In general, according to one embodiment, an electronic device includes a display processor, a transmitter and a receiver. The display processor displays on a screen a handwritten document including a plurality of strokes described by handwriting. The transmitter transmits to a system a handwritten part designated by a select range on the screen. The receiver receives from the system a reshaping result corresponding to the handwritten part. The display processor displays the reshaping result on the screen, the reshaping result and the handwritten part associated with each other.

FIG. 1 is a perspective view illustrating an external appearance of an electronic device according to an embodiment. The electronic device is, for instance, a pen-based portable electronic device which can execute a handwriting input by a pen or a finger. This electronic device may be realized as a tablet computer, a notebook-type personal computer, a smartphone, a PDA, etc. In the description below, the case is assumed that this electronic device is realized as a tablet computer 10. The tablet computer 10 is a portable electronic device which is also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor, the sensor being configured to detect a touch position of a pen or a finger on the screen of the flat-panel display, are assembled. The flat-panel display may be, for instance, a liquid crystal display (LCD). As the sensor, for example, use may be made of an electrostatic capacitance-type touch panel, or an electromagnetic induction-type digitizer. In the description below, the case is assumed that two kinds of sensors, namely a digitizer and a touch panel, are both assembled in the touch-screen display 17.

The touch-screen display 17 can detect not only a touch operation on the screen with use of a finger, but also a touch operation on the screen with use of a pen 100. The pen 100 may be, for instance, an electromagnetic-induction pen. The user can execute a handwriting operation on the touch-screen display 17 by using an external object (pen 100 or finger). During the handwriting input operation, a locus of movement of the external object (pen 100 or finger) on the screen, that is, a stroke (locus of a handwriting stroke) that is handwritten by the handwriting input operation, is drawn in real time, and thereby a plurality of strokes, which have been input by handwriting, are displayed on the screen. A locus of movement of the external object during a time in which the external object is in contact with the screen corresponds to one stroke. A set of many strokes, which correspond to handwritten characters, handwritten figures or handwritten tables, constitutes a handwritten document.

In the present embodiment, the handwritten document is stored in a storage medium not as image data but as time-series information (handwritten document data) indicative of coordinate series of loci of each stroke and an order relation between strokes. The details of the time-series information will be described later with reference to FIG. 4. The time-series information is indicative of an order in which a plurality of strokes were handwritten, and includes a plurality of stroke data corresponding to a plurality of strokes. In other words, the time-series information means a set of time-series stroke data corresponding to a plurality of strokes, respectively. Each stroke data corresponds to a certain single stroke, and includes coordinate data series (time-series coordinates) corresponding to points on the locus of this stroke. The order of arrangement of these stroke data corresponds to an order in which strokes were handwritten.

The tablet computer 10 can read out arbitrary existing time-series information from the storage medium, and can display, on the screen, a handwritten document corresponding to this time-series information, that is, a plurality of strokes indicated by this time-series information. These strokes indicated by the time-series information are also a plurality of strokes which are input by handwriting.

Furthermore, the tablet computer 10 has an edit function. The edit function can delete or move an arbitrary part (e.g. a handwritten character, a handwritten mark, a handwritten figure, a handwritten table) in a displayed handwritten document which is selected by a range select tool in accordance with an edit operation by the user with use of an "eraser" tool, a range select tool, and other various tools. In addition, this edit function can execute various functions on a handwritten part belonging in a selected range, for example, a figure reshaping function, a table reshaping function, and a handwritten character reshaping function. These reshaping functions can be executed by making use of a cloud server system.

In the present embodiment, the handwritten document may be managed as one page or plural pages. In this case, the time-series information (handwritten document data) may be divided in units of an area which falls within one screen, and thereby a piece of time-series information, which falls within one screen, may be stored as one page. Alternatively, the size of one page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll. In the meantime, as a handwritten document which is to be displayed by the tablet computer 10, use may be made of an arbitrary handwritten document including a plurality of strokes (handwritten strokes) described by handwriting.

FIG. 2 illustrates an example of a cooperative operation between the tablet computer 10 and a handwritten document conversion system 2. The tablet computer 10 can cooperate with the handwritten document conversion system 2. Specifically, the tablet computer 10 includes a wireless communication device of, e.g. wireless LAN, and can communicate with the handwritten document conversion system 2 on the Internet. The handwritten document conversion system 2 is composed of one or more servers which execute various cloud computing services.

The handwritten document conversion system 2 can execute a service of converting a handwritten document 31 (a plurality of stroke data), which has been received from the tablet computer 10, to an electronic document of a file format which can be viewed/edited by existing word-processor software or existing presentation software. In this conversion service, handwritten characters, handwritten figures, and handwritten tables in the handwritten document 31 are reshaped. In the reshaping of a handwritten character string, this handwritten character string is converted to some character codes by character recognition. In the reshaping of a handwritten figure, this handwritten figure is converted to object data which can be viewed/edited by existing word-processor software or existing presentation software. For example, a handwritten circle is converted to a circular shaped graphic object. In the reshaping of a handwritten table, this handwritten table is converted to a table object including the same number of cells as the number of cells of the handwritten table. Further, a handwritten character string included in each cell of the handwritten table is converted to some character codes.

The tablet computer 10 can transmit (upload) a plurality of stroke data, which constitute the handwritten document 31, to the handwritten document conversion system 2, and can request the handwritten document conversion system 2 to execute reshaping (conversion) of the handwritten document 31. Then, the tablet computer 10 can receive (download) an electronic document 32, which is a reshaping result of the handwritten document 31, from the handwritten document conversion system 2. In addition, the tablet computer 10 can transmit (upload) only an arbitrary handwritten part of the handwritten document 31 to the handwritten document conversion system 2, and can request the handwritten document conversion system 2 to execute reshaping (conversion) of this handwritten part.

Next, a description is given of an example of the cooperative operation between the tablet computer 10 and the handwritten document conversion system 2. The tablet computer 10 accesses the handwritten document conversion system 2, and transmits the handwritten document 31, which is a target of conversion, to the handwritten document conversion system 2 via an interface 20 of the handwritten document conversion system 2. In this case, the tablet computer 10 can designate the file format after conversion of the handwritten document 31 (e.g. PDF, image data, vector data, Word™ of Microsoft Corp., Excel™ of Microsoft Corp., PowerPoint™ of Microsoft Corp., etc.) to the handwritten document conversion system 2. The handwritten document 31 is stored in a storage 21 of the handwritten document conversion system 2. A text/figure/table reshaping engine 22 receives the handwritten document 31 from the storage 21, recognizes a handwritten character string, a handwritten figure and a handwritten table in the handwritten document 31, and reshapes these handwritten character string, handwritten figure and handwritten table. An electronic document conversion engine 23 receives a reshaping result from the text/figure/table reshaping engine 22. Then, the electronic document conversion engine 23 converts the reshaping result to an electronic document 32 of a file format designated by the tablet computer 10, and stores the electronic document 32 in the storage 21. The tablet computer 10 can view the electronic document 32 via the interface 20, or can receive (download) the electronic document 32 from the handwritten document conversion system 2 via the interface 20.

In the meantime, as described above, the tablet computer 10 can transmit an arbitrary handwritten part of the handwritten document 31 to the handwritten document conversion system 2, and can receive a reshaping result corresponding to this handwritten part from the handwritten document conversion system 2. Object data corresponding to this reshaping result may be vector data which can be handled by various kinds of software, or may be image data.

Next, referring to FIG. 3 and FIG. 4, a description is given of a relationship between strokes (characters, figures, tables, etc.), which are handwritten by the user, and time-series information. FIG. 3 shows an example of a handwritten document (handwritten character string) which is handwritten on the touch-screen display 17 by using the pen 100 or the like.

In many cases, on a handwritten document, other characters or figures are handwritten over already handwritten characters or figures. In FIG. 3, the case is assumed that a handwritten character string "ABC" was input in the order of "A", "B" and "C", and thereafter a handwritten arrow was input by handwriting near the handwritten character "A".

The handwritten character "A" is expressed by two strokes (a locus of "^" shape, a locus of "-" shape) which are handwritten by using the pen 100 or the like, that is, by two loci. The locus of the pen 100 of the first handwritten "^" shape is sampled in real time, for example, at regular time intervals, and thereby time-series coordinates SD11, SD12, ..., SD1n of the stroke of the "^" shape are obtained. Similarly, the locus of the pen 100 of the next handwritten "-" shape is sampled in real time, for example, at regular time intervals, and thereby time-series coordinates SD21, SD22, ..., SD2n of the stroke of the "-" shape are obtained.

The handwritten character "B" is expressed by two strokes which are handwritten by using the pen 100 or the like, that is, by two loci. The handwritten character "C" is expressed by one stroke which is handwritten by using the pen 100 or the like, that is, by one locus. The handwritten "arrow" is expressed by two strokes which are handwritten by using the pen 100 or the like, that is, by two loci.

FIG. 4 illustrates time-series information 200 corresponding to the handwritten document of FIG. 3. The time-series information 200 includes a plurality of stroke data SD1, SD2, ..., SD7. In the time-series information 200, the stroke data SD1, SD2, ..., SD7 are arranged in time series in the order in which the strokes were handwritten.

In the time-series information 200, the first two stroke data SD1 and SD2 are indicative of two strokes of the handwritten character "A". The third and fourth stroke data SD3 and SD4 are indicative of two strokes which constitute the handwritten character "B". The fifth stroke data SD5 is indicative of one stroke which constitutes the handwritten character "C". The sixth and seventh stroke data SD6 and SD7 are indicative of two strokes which constitute the handwritten "arrow".

Each stroke data includes coordinate data series (time-series coordinates) corresponding to one stroke, that is, a plurality of coordinates corresponding to a plurality of points on the locus of one stroke. In each stroke data, the plural coordinates are arranged in time series in the order in which the stroke is written. For example, as regards handwritten character "A", the stroke data SD1 includes coordinate data series (time-series coordinates) corresponding to the points on the locus of the stroke of the handwritten "^" shape of the handwritten character "A", that is, an n-number of coordinate data SD11, SD12, ..., SD1n. The stroke data SD2 includes coordinate data series corresponding to the points on the locus of the stroke of the handwritten "-" shape of the handwritten character "A", that is, an n-number of coordinate data SD21, SD22, ..., SD2n. Incidentally, the number of coordinate data may differ between respective stroke data.

Each coordinate data is indicative of an X coordinate and a Y coordinate, which correspond to one point in the associated locus. For example, the coordinate data SD11 is indicative of an X coordinate (X11) and a Y coordinate (Y11) of the starting point of the stroke of the "^" shape. The coordinate data SD1n is indicative of an X coordinate (X1n) and a Y coordinate (Yin) of the end point of the stroke of the "^" shape.

Further, each coordinate data may include time stamp information T corresponding to a time point at which a point corresponding to the coordinates of this coordinate data was handwritten. The time point at which the point was handwritten may be either an absolute time (e.g. year/month/day/hour/minute/second) or a relative time with reference to a certain time point. For example, an absolute time (e.g. year/month/day/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relation between strokes can be more precisely expressed.

Moreover, information (Z) indicative of a pen stroke pressure may be added to each coordinate data.

The time-series information 200 having the structure as described with reference to FIG. 4 can express not only the trace of handwriting of each stroke, but also the temporal relation between strokes. Thus, with the use of the time-series information 200, even if a distal end portion of the handwritten "arrow" is written over the handwritten character "A" or near the handwritten character "A", as shown in FIG. 3, the handwritten character "A" and the distal end portion of the handwritten "arrow" can be treated as different characters or figures.

Furthermore, in the present embodiment, as described above, handwritten document data is stored not as an image or a result of character recognition, but as the time-series information 200 which is composed of a set of time-series stroke data. Thus, handwritten characters can be handled, without depending on languages of the handwritten characters. Therefore, the structure of the time-series information 200 of the present embodiment can be commonly used in various countries of the world where different languages are used.

Figure 5:
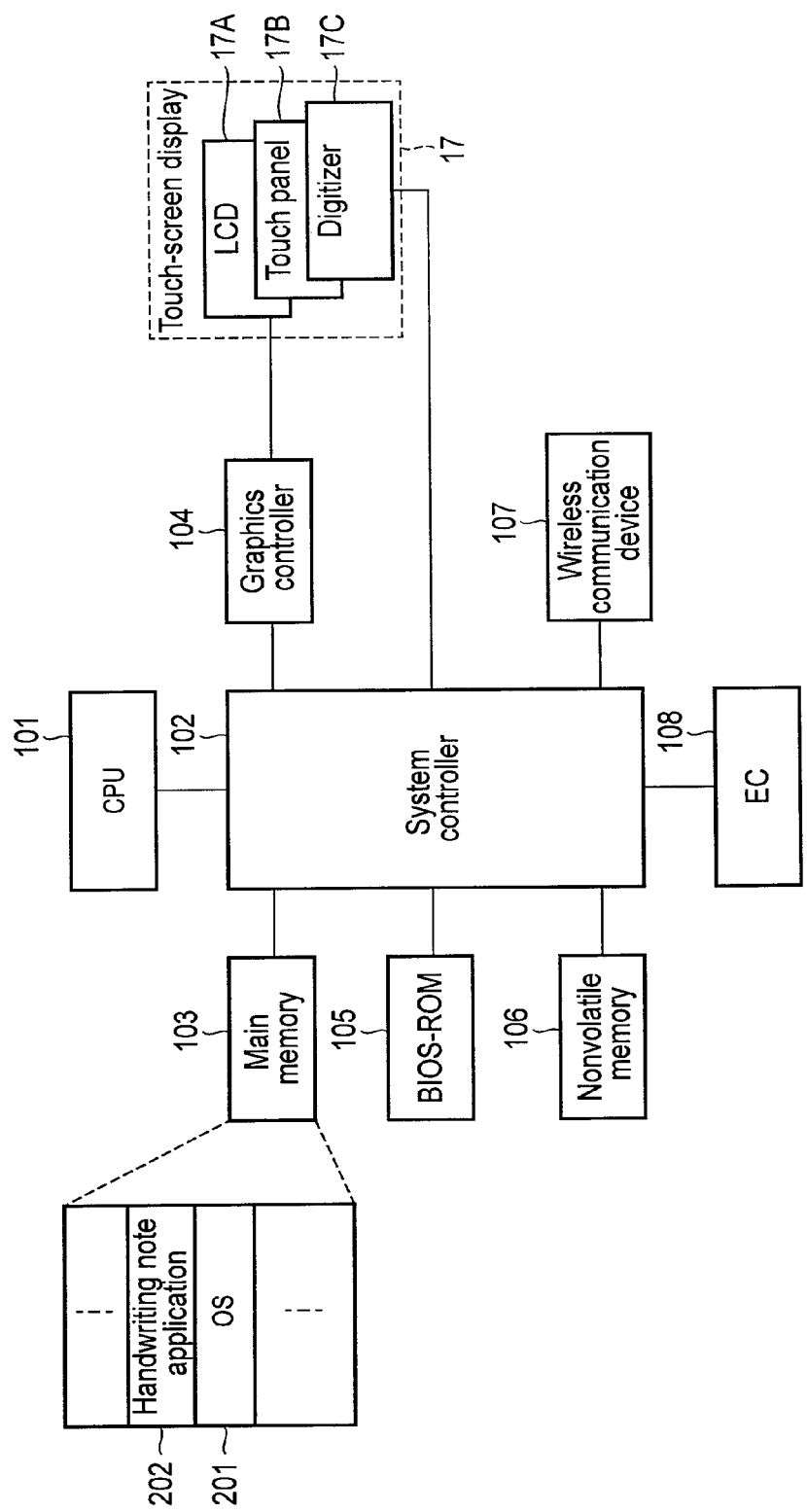
FIG. 5 is a block diagram illustrating a system configuration of the electronic device of the embodiment.

FIG. 5 illustrates a system configuration of the tablet computer 10.

As shown in FIG. 5, the tablet computer 10 includes a CPU 101, a system controller 102, a main memory 103, a graphics controller 104, a BIOS-ROM 105, a nonvolatile memory 106, a wireless communication device 107, and an embedded controller (EC) 108.

The CPU 101 is a processor which controls the operations of various modules in the tablet computer 10. The CPU 101 executes various kinds of software, which are loaded from the nonvolatile memory 106 that is a storage device into the main memory 103. The software includes an operating system (OS) 201 and various application programs. The application programs include a handwriting note application program 202. The handwriting note application program 202 includes a function of creating and displaying the above-described handwritten document, and a function of reshaping the handwritten document in cooperation with the document conversion system 2.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B and a digitizer 17C are disposed on the LCD 17A. The touch panel 17B is an electrostatic capacitance-type pointing device for executing an input on the screen of the LCD 17A. A contact position on the screen, which is touched by a finger, and a movement of the contact position, are detected by the touch panel 17B. The digitizer 17C is an electromagnetic induction-type pointing device for executing an input on the screen of the LCD 17A. A contact position on the screen, which is touched by the pen 100, and a movement of the contact position, are detected by the digitizer 17C.

The wireless communication device 107 is a device configured to execute wireless communication such as wireless LAN or 3G mobile communication. The EC 108 is a one-chip microcomputer including an embedded controller for power management. The EC 108 includes a function of powering on or powering off the tablet computer 10 in accordance with an operation of a power button by the user.

Next, examples of some typical screens, which are presented to the user by the handwriting note application program 202, are described.

FIG. 6 illustrates a desktop/drawer screen which is displayed by the handwriting application program 202. The desktop/drawer screen is a basic screen for handling a plurality of handwritten document data. In the description below, the handwritten document data is also referred to as "handwritten note".

The desktop/drawer screen includes a desktop screen area 70 and a drawer screen area 71. The desktop screen area 70 is a temporary area which displays a plurality of note icons 801 to 805 corresponding to a plurality of handwritten notes on which work is being done. Each of the note icons 801 to 805 displays the thumbnail of a certain page in a corresponding handwritten note. The desktop screen area 70 further displays a pen icon 771, a calendar icon 772, a scrap note icon 773, and a tag icon 774.

The pen icon 771 is a graphical user interface (GUI) for switching the display screen from the desktop/drawer screen to a note view screen which will be described with reference to FIG. 8. The calendar icon 772 is an icon indicating the present date. The calendar icon 772 is a GUI for switching the display screen from the desktop/drawer screen to a time-line note screen which is associated with the present date. The scrap note icon 773 is a GUI for creating or viewing scrap data. The created scrap data is registered in a scrapbook (scrap note). The scrap note icon 773 displays the thumbnail of each scrap data registered in the scrapbook. An electronic document (the reshaping result of a handwritten document), which is received from the document conversion system 2, can be registered in the scrapbook as scrap data. The user can import arbitrary scrap data in the scrapbook to a handwritten note which is being created/edited. The tag icon 774 is a GUI for attaching a sticky (tag) to an arbitrary page in an arbitrary handwritten note.

The drawer screen area 71 is a display area for viewing a storage area for storing all created handwritten notes. The drawer screen area 71 displays note icons 80A, 80B and 80C corresponding to some handwritten notes of all the handwritten notes. Each of the note icons 80A, 80B and 80C displays the thumbnail of a certain page in the corresponding handwritten note. The handwriting note application program 202 can detect a gesture (e.g. swipe gesture) on the drawer screen area 71, which is performed by the user by using the external object. Responding to the detection of the gesture (e.g. swipe gesture), the handwriting note application program 202 scrolls the screen image on the drawer screen area 71 to the left or right. Thereby, note icons corresponding to arbitrary handwritten notes can be displayed on the drawer screen area 71.

Figure 7:
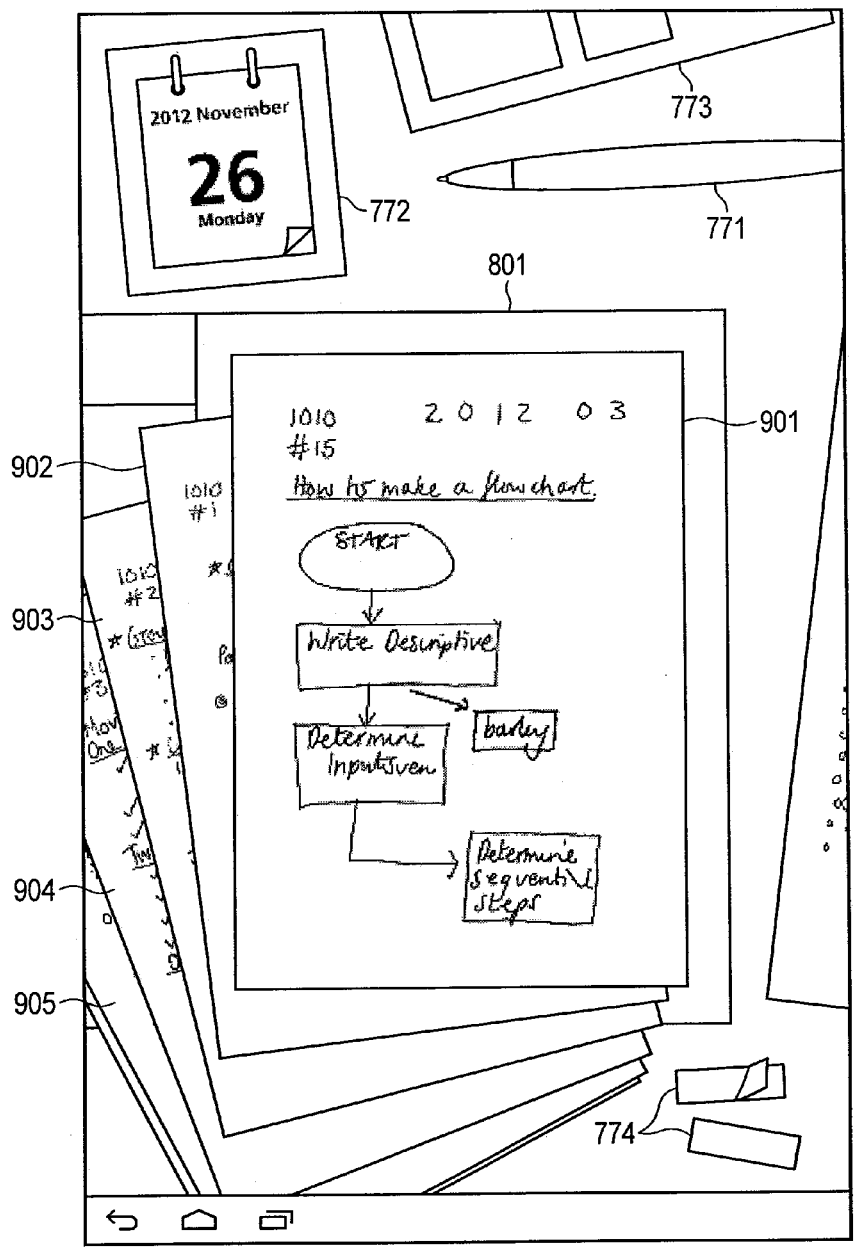
FIG. 7 is a view illustrating a desktop screen which is displayed by the electronic device of the embodiment.

Further, the handwriting note application program 202 can detect a gesture (e.g. tap gesture) on a note icon of the drawer screen area 71, which is performed by the user by using the external object. Responding to the detection of the gesture (e.g. tap gesture) on a certain note icon on the drawer screen area 71, the handwriting note application program 202 moves this note icon to a central part of the desktop screen area 70. Then, the handwriting note application program 202 selects a handwritten note corresponding to this note icon, and displays a desktop screen shown in FIG. 7 in place of the desktop/drawer screen. The desktop screen of FIG. 7 is a screen which enables viewing of an arbitrary page in the selected handwritten note.

Moreover, the handwriting note application program 202 can detect a gesture (e.g. tap gesture) on the desktop screen area 70, which is performed by the user by using the external object. Responding to the detection of the gesture (e.g. tap gesture) on a note icon located at the central part of the desktop screen area 70, the handwriting note application program 202 selects a handwritten note corresponding to the note icon located at the central part, and displays the desktop screen shown in FIG. 7 in place of the desktop/drawer screen.

As described above, the desktop screen of FIG. 7 is a screen which enables viewing of an arbitrary page in the selected handwritten note. The case is now assumed that a handwritten note corresponding to the note icon 801 has been selected. In this case, the handwriting note application program 202 displays a plurality of pages 901, 902, 903, 904 and 905 in such a manner that at least a part of each of these pages 901, 902, 903, 904 and 905 is visible and that these pages 901, 902, 903, 904 and 905 overlap.

The desktop screen further displays the above-described pen icon 771, calendar icon 772, scrap note icon 773, and tag icon 774.

The handwriting note application program 202 can detect various gestures on the desktop screen, which are performed by the user. For example, responding to the detection of a certain gesture, the handwriting note application program 202 changes a page, which is to be displayed uppermost, to an arbitrary page (forward page turn, backward page turn). In addition, responding to the detection of a certain gesture (e.g. tap gesture) which is performed on the uppermost page, or responding to the detection of a certain gesture (e.g. tap gesture) which is performed on the pen icon 771, the handwriting note application program 202 selects the uppermost page and displays a note view screen shown in FIG. 8 in place of the desktop screen.

Figure 8:
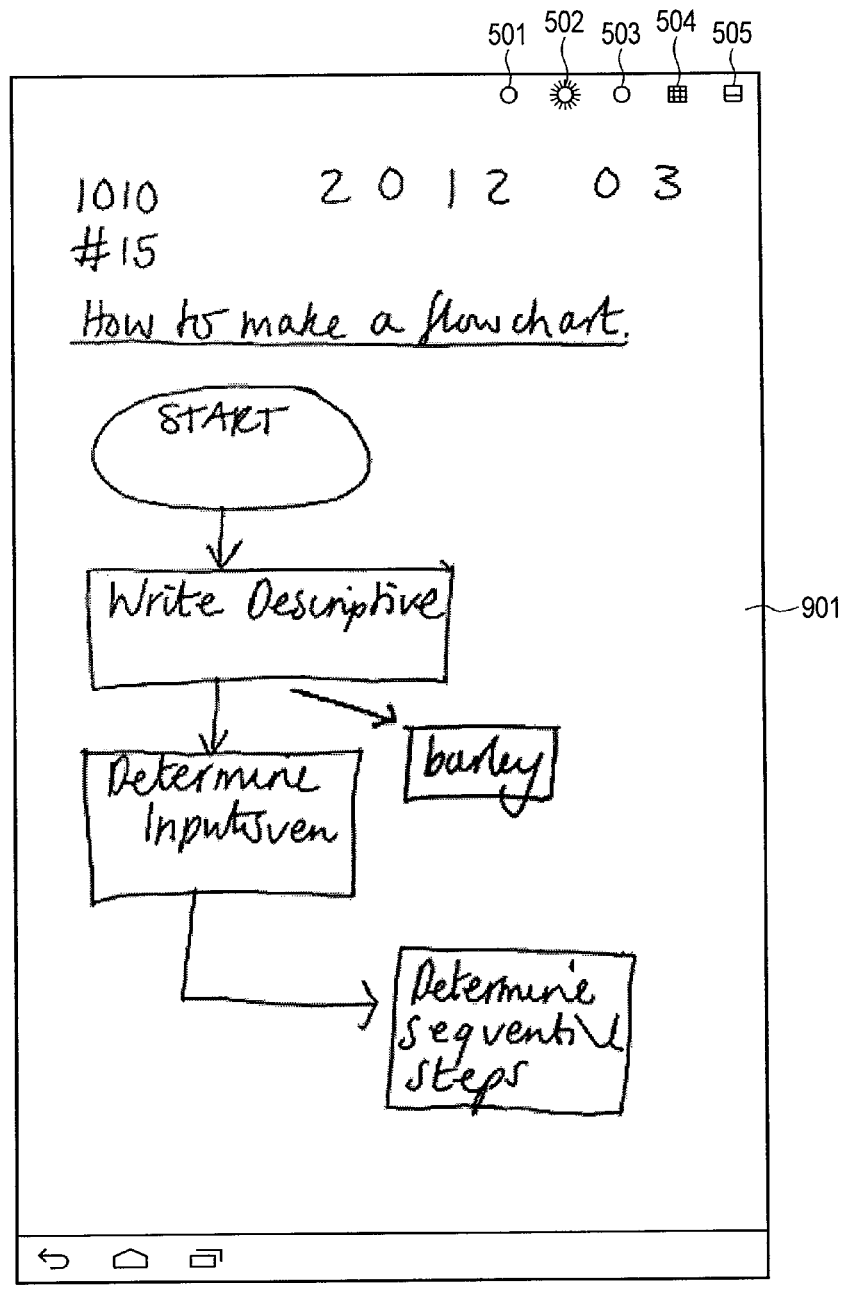
FIG. 8 is a view illustrating a note view screen which is displayed by the electronic device of the embodiment.

The note view screen of FIG. 8 is a screen which enables creation of a new page (handwritten page), and viewing and edit of an existing page. When the page 901 on the desktop screen of FIG. 7 has been selected, the note view screen displays the content of the page 901, as shown in FIG. 8.

The note view screen further displays a black pen button, a red pen button 502, a marker button 503, a select button 504 and an eraser button 505.

For example, if a handwriting input operation with use of the pen 100 is performed on the note view screen in the state in which the black pen button 501 is selected by a tap gesture by the user, the handwriting note application program 202 displays a black stroke (locus) on the note view screen in accordance with the movement of the pen 100. The select button 504 is a button for activating a range select tool for selecting an arbitrary range on the note view screen. If a handwriting input operation with use of the pen 100 is performed on the note view screen in the state in which the select button 504 is selected by a tap gesture by the user, the handwriting note application program 202 draws a rectangular frame or a free frame in the note view screen in accordance with a drag operation of the pen 100. A part surrounded by this rectangular frame or free frame is used as a select range.

Figure 9:
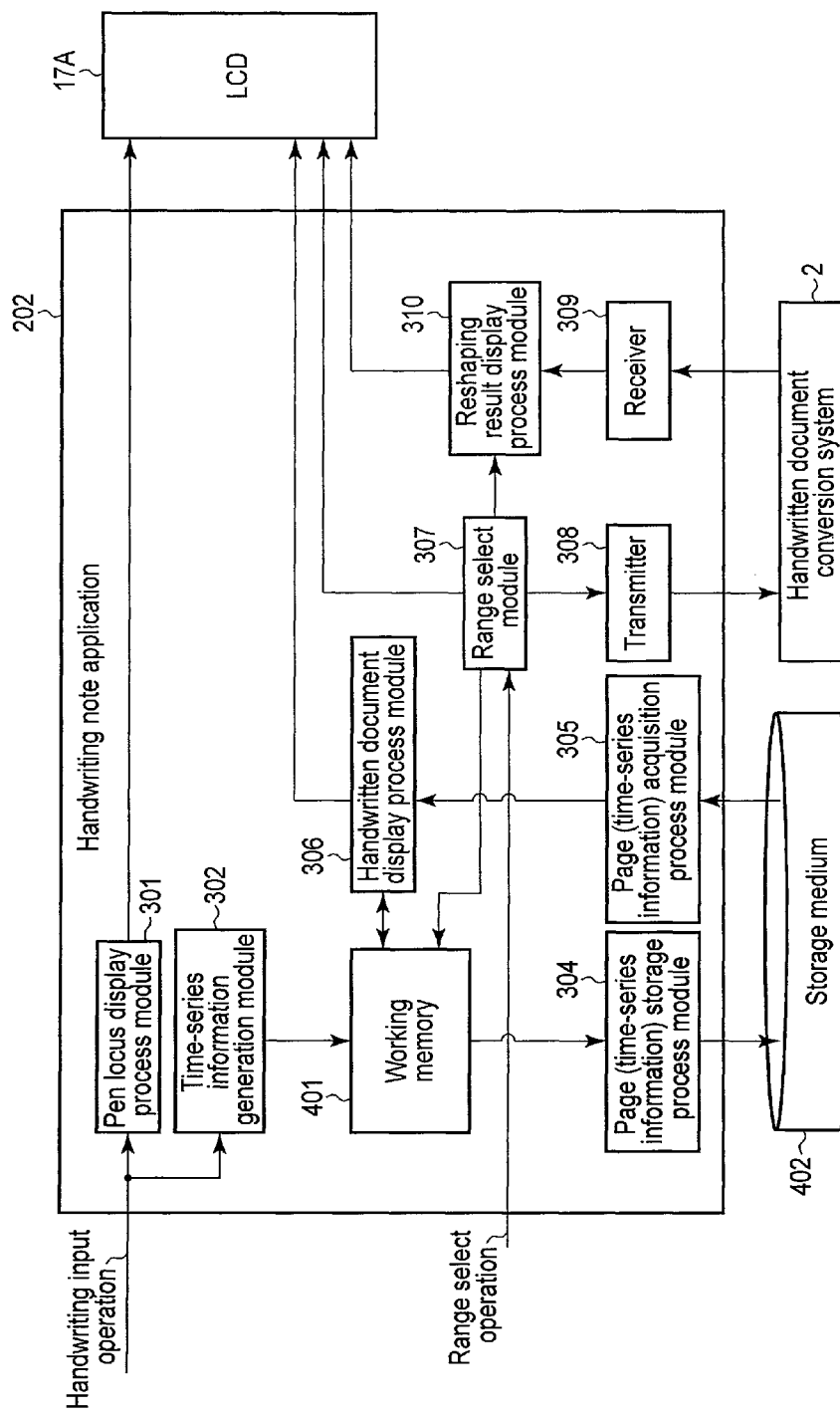
FIG. 9 is a block diagram illustrating a functional configuration of a digital notebook application program which is executed by the electronic device of the embodiment.

FIG. 9 illustrates a functional configuration of the handwriting note application program 202.

The handwriting note application 202 is a WYSIWYG application which can handle handwritten data, and includes a pen locus display process module 301, a time-series information generation module 302, a page storage process module 304, a page acquisition process module 305, a handwritten document display process module 306, a range select module 307, a transmitter 308, a receiver 309, and a reshaping result display process module 310.

The handwriting note application program 202 executes creation, display and edit of a handwritten document, by using stroke data which is input by using the touch-screen display 17. The touch-screen display 17 is configured to detect the occurrence of events such as "touch", "move (slide)" and "release". The "touch" is an event indicating that an external object has come in contact with the screen. The "move (slide)" is an event indicating that the position of contact of the external object has been moved while the external object is in contact with the screen. The "release" is an event indicating that the external object has been released from the screen.

The pen locus display process module 301 and time-series information generation module 302 receive an event "touch" or "move (slide)" which is generated by the touch-screen display 17, thereby detecting a handwriting input operation. The "touch" event includes coordinates of a contact position. The "move (slide)" event also includes coordinates of a contact position at a destination of movement. Thus, the pen locus display process module 301 and time-series information generation module 302 can receive coordinate series, which correspond to the locus of movement of the contact position, from the touch-screen display 17.

The pen locus display process module 301 displays a plurality of strokes, which are input by handwriting, on the screen of the LCD 17A in the touch-screen display 17. To be more specific, the pen locus display process module 301 receives coordinate series from the touch-screen display 17 and displays, based on the coordinate series, each stroke corresponding to a handwritten object, which is written by a handwriting input operation with use of the pen 100 or the like, on the screen of the LCD 17A in the touch-screen display 17. By the pen locus display process module 301, the locus of the pen 100 during a time in which the pen 100 is in contact with the screen, that is, the locus of each stroke, is drawn on the screen of the LCD 17A.

The time-series information generation module 302 receives the above-described coordinate series which are output from the touch-screen display 17, and generates, based on the coordinate series, the above-described time-series information (a set of stroke data) having the structure as described in detail with reference to FIG. 4. In this case, the time-series information, that is, the coordinates and time stamp information corresponding to the respective points of each stroke, may be temporarily stored in a working memory 401.

The page storage process module 304 stores the generated time-series information as a handwritten document (handwritten page) in a storage medium 402. The storage medium 402 may be either a storage device in the tablet computer 10 or a storage device in the system 2.

The page acquisition process module 305 reads out from the storage medium 402 arbitrary time-series information which is already stored in the storage medium 402. The read-out time-series information is sent to the handwritten document display process module 306. The handwritten document display process module 306 analyzes the time-series information and displays, based on the analysis result, each stroke indicated by the time-series information (each stroke input by handwriting) on the screen as a handwritten page.

The range select module 307 selects from a handwritten page a handwritten part which is designated by a select range on the note view screen. The selection of this handwritten part is executed in accordance with a range select operation which is performed by the user. The range select operation is an operation for selecting an arbitrary part in the handwritten page on the note view screen, that is, an arbitrary handwritten part. For example, by using the "range select" tool, the user can surround an arbitrary part on the screen by a rectangular frame or the like by the operation of the pen 100. The range select module 307 can select a handwritten part belonging in the select range surrounded by the rectangular frame, that is, a plurality of strokes belonging in the select range, as a process-target handwritten part on which the function of, for example, the above-described reshaping is to be executed.

The transmitter 308 is configured to transmit the handwritten part, which is selected by the range select module 307, to the handwritten document conversion system 2. To be more specific, the transmitter 308 transmits a plurality of stroke data corresponding to the handwritten part (plural strokes), which is selected by the range select module 307, to the handwritten document conversion system 2. The receiver 309 receives a reshaping result (one or more object data), which is obtained by reshaping the above-described handwritten part (plural strokes), from the handwritten document conversion system 2. The reshaping result display process module 310 displays the reshaping result on the note view screen. Thereby, the user can reshape only the handwritten part corresponding to the select range in the handwritten page, while keeping handwritten parts, other than the select range in the handwritten page, in a handwritten state.

In the process of displaying the reshaping result on the note view screen, the reshaping result display process module 310 displays the reshaping result and the above-described handwritten part on the note view screen in a fashion in which the reshaping result and the above-described handwritten part are associated with each other, so that the user may easily visually compare the reshaping result and the handwritten part. In this manner, by displaying the reshaping result and the above-described handwritten part by mutually associating the reshaping result and the handwritten part, even when only a part in the handwritten page is to be reshaped, it is possible to present the reshaping result so that the user can easily understand which handwritten part in the handwritten page the reshaping result corresponds to.

Figure 10:
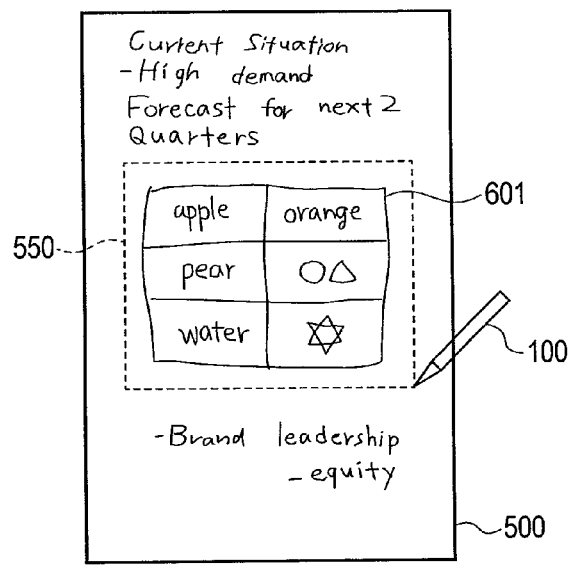
FIG. 10 is a view for describing a range select operation which is executed by the electronic device of the embodiment.

FIG. 10 illustrates an example of a range select operation which is executed by the range select module 307. In a note view screen 500 of FIG. 10, the case is assumed that a handwritten page including a plurality of handwritten character strings and a handwritten table 601 is displayed, and this handwritten table 601 is surrounded by a rectangular frame 550 which is drawn by using a range select tool. The range select module 307 selects from the handwritten page the table 601 which is designated by the select range indicated by the rectangular frame 550.

Figure 11:
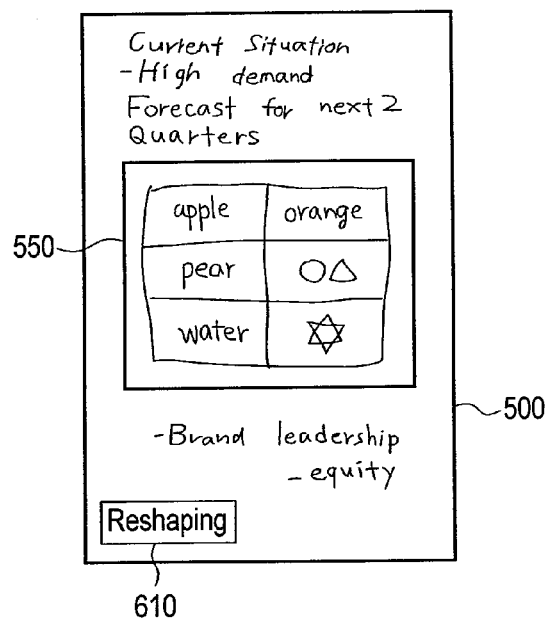
FIG. 11 is a view for describing a user interface for executing a reshaping function, the user interface being displayed by the electronic device of the embodiment.

As illustrated in FIG. 11, the handwriting note application program 202 displays a reshaping button 610 on the note view screen 500. If the reshaping button 610 is tapped by the user's finger or the pen 100, the transmitter 308 transmits to the handwritten document conversion system 2 a plurality of stroke data corresponding to the handwritten part (handwritten table 601 in this example) selected by the range select module 307. The receiver 309 receives a reshaping result of the handwritten table 601 from the handwritten document conversion system 2. Then, based on the display position of the handwritten part on the note view screen, the reshaping result display process module 310 can display the handwritten table 601 and the reshaping result of the handwritten table 601 on the note view screen in a fashion in which the handwritten table 601 and the reshaping result are associated with each other.

As the display mode for displaying the handwritten table 601 and the reshaping result on the note view screen in a fashion in which the handwritten table 601 and the reshaping result are associated with each other, use may be made of an arbitrary display mode in which the user can visually compare the handwritten part (handwritten table 601) before reshaping and the reshaping result.

For example, the reshaping result display process module 310 may switch the display mode of the handwritten page between a first display mode in which the reshaping result, in place of the handwritten table 601, is displayed at the display position of the handwritten table 601, and a second display mode in which the handwritten table 601, in place of the reshaping result, is displayed at the above-described display position.

In this case, as shown in FIG. 12, the reshaping result display process module 310 displays a reshaping result 602, in place of the handwritten table 601, at the display position of the handwritten table 601, based on the display position of the handwritten part (handwritten table 601). Specifically, the reshaping result display process module 310 replaces the handwritten table 601 in the handwritten page with the reshaping result 602.

The reshaping result display process module 310 can detect a gesture (e.g. a tap gesture performed by the user's finger) which is performed on the reshaping result 602 of FIG. 12. As shown in FIG. 13, responding to the detection of the gesture performed on the reshaping result 602 of FIG. 12, the reshaping result display process module 310 displays a display switch button 621 near the reshaping result 602. The display switch button 621 is a user interface for switching the display mode of the handwritten page between the above-described first display mode and the above-described second display mode.

Figure 14:
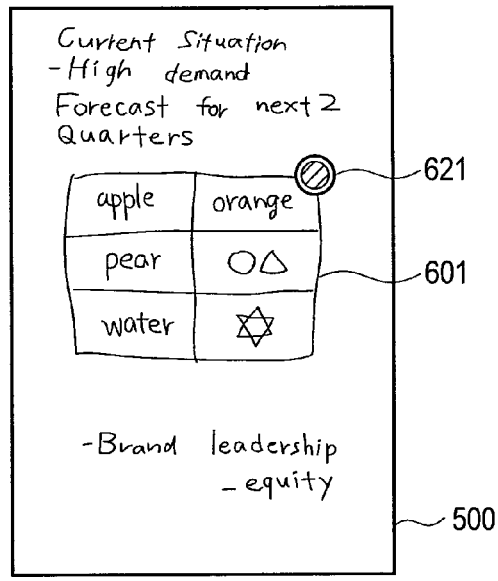
FIG. 14 is a view illustrating the handwritten part which is displayed in place of the reshaping result by the electronic device of the embodiment.

When the display switch button 621 has been tapped by the pen 100 or finger, the reshaping result display process module 310 displays, as shown in FIG. 14, the handwritten table 601, in place of the reshaping result 602, at the original display position, based on display position of the handwritten part (handwritten table 601). The display switch button 621 is displayed near the handwritten table 601. When the display switch button 621 is tapped once again by the pen 100 or finger, the reshaping result display process module 310 displays the reshaping result 602 as shown in FIG. 13. The reshaping result 602 is displayed, in place of the handwritten table 601, at the display position of the handwritten table 601, based on the display position of the handwritten part.

In this manner, in the present embodiment, in accordance with the user's operation, the display mode of the handwritten page can be switched between the display mode of FIG. 12 or FIG. 13 in which the display content in the select range in the handwritten page is replaced with the reshaping result, and the display mode of FIG. 14 in which the display content in the select range is restored to the original handwritten part. Thereby, even in the case where the size of the note view screen is limited, the user can easily confirm whether the reshaping result is correct or not, by visually comparing the content of the handwritten part before conversion and the content of the reshaping result. When the reshaping result is not correct, the user taps, for example, an undo button (not shown), whereby the user can restore the note view screen to the state before the execution of the range select operation. Then, where necessary, the user can perform once again the range select operation and the tap operation of the reshaping button 610.

Figure 15:
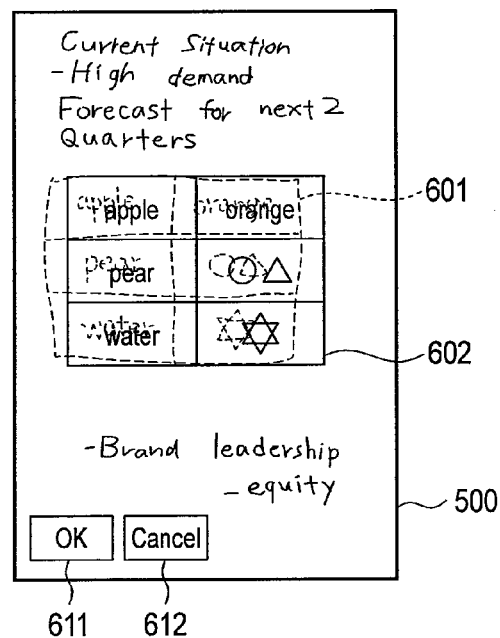
FIG. 15 is a view illustrating the reshaping result which is displayed over the handwritten part by the electronic device of the embodiment.

As an arbitrary display mode in which the user can visually compare the handwritten part before reshaping (handwritten table 601) and the reshaping result, use may be made of a display mode, as shown in FIG. 15, in which the display area of the reshaping result 602 and the display area of the handwritten table 601 are displayed in an at least partly overlapping manner. In this case, the reshaping result display process module 310 may display the display area of the reshaping result 602 in a manner to overlap at least a part of the display area of the handwritten table 601. Further, in order to prevent the reshaping result 602 from becoming less easily visible due to an overlap between a plurality of character strings and a plurality of lines in the reshaping result 602 and a plurality of character strings and a plurality of lines in the handwritten part (handwritten table 601), the reshaping result display process module 310 may also change, as shown in FIG. 15, the line kind (thickness, solid line/broken line, etc.) and the color of a plurality of strokes included in the handwritten part (handwritten table 601). As the method of changing the color of each stroke, use may be made of an arbitrary method which can thinly display each stroke. For example, the gray level of the present color of each stroke may be varied. Alternatively, the present color of each stroke may be changed to a predetermined specific light color.

In addition, as the method of changing the line kind (thickness, solid line/broken line, etc.) of a plurality of strokes, use may be made of an arbitrary method which can thinly display each stroke. For example, (1) the line thickness of the plural strokes may be decreased, or (2) the plural strokes may be represented by broken lines.

Then, based on the display position of the handwritten part, the reshaping result display process module 310 displays the reshaping result 602 in a manner to overlap the handwritten table 601, as shown in FIG. 15. In this case, it is not always necessary that the entire display area of the reshaping result 602 overlaps the display area of the handwritten table 601. The display position of the display area of the reshaping result 602 may be displaced in an up-and-down direction or a right-and-left direction, relative to the display position of the display area of the handwritten table 601, so that the display area of the reshaping result 602 may partly overlap the display area of the handwritten table 601. Furthermore, the reshaping result display process module 310 effects such display that at least a part of the handwritten table 601 may be seen through the display area of the reshaping result 602, in the display area of the reshaping result 602, which overlaps the display area of the handwritten table 601. For example, the reshaping result display process module 310 may set the degree of transparency of the background of the reshaping result 602 (the display area of the reshaping result 602) so that the handwritten table 601, which is located behind the reshaping result 602, may be seen through the background of the reshaping result 602 (the display area of the reshaping result 602). In this case, the background of the reshaping result 602 may be transparent.

Besides, the reshaping result display process module 310 may display an "OK" button 611 and a "Cancel" button 612 on the note view screen. When the "OK" button 611 has been operated (e.g. a tap operation) by the user, the reshaping result display process module 310 replaces the handwritten table 601 with the reshaping result 602. In this case, the handwritten table 601 is erased from the note view screen, and the display position of the reshaping result 602 is moved, where necessary, so that the reshaping result 602 may be displayed at the display position of the original handwritten table 601. On the other hand, when the "Cancel" button 612 has been operated (e.g. a tap operation) by the user, the reshaping result display process module 310 erases the reshaping result 602 from the note view screen, and restores the line kind (thickness, solid line/broken line, etc.) and the color of the plural strokes included in the handwritten table 601 to the original state.

Figure 16:
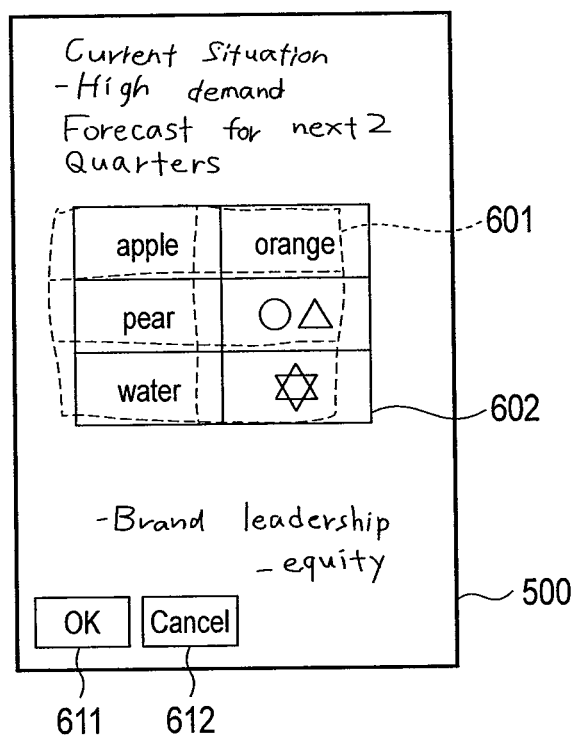
FIG. 16 is a view illustrating the reshaping result which is displayed over the handwritten part, in which handwritten characters were deleted, by the electronic device of the embodiment.

In addition, as shown in FIG. 16, in order to prevent the reshaping result 602 from becoming less easily visible due to an overlap between a plurality of character strings and a plurality of lines in the reshaping result 602 and a plurality of character strings and a plurality of lines in the handwritten table 601, the reshaping result display process module 310 may erase, from the note view screen, the locus of one or more strokes corresponding to each handwritten character in the handwritten table 601. In this case, only the plural strokes corresponding to plural ruled lines of the handwritten table 601 are displayed, and the plural strokes corresponding to handwritten characters in each cell of the handwritten table 601 are not displayed. By deleting the plural strokes corresponding to handwritten characters in each cell, the visibility of the reshaping result 602 can be enhanced. Furthermore, even if the plural strokes corresponding to handwritten characters in each cell are deleted, the user can visually compare the plural ruled lines of the handwritten table 601 and the plural ruled lines of the reshaping result 602. Thus, the user can confirm whether the number of vertical and horizontal elements (cells) of the reshaping result 602 is equal to the number of vertical and horizontal elements (cells) of the handwritten table 601.

Besides, the reshaping result display process module 310 may change the line kind (thickness, solid line/broken line, etc.) and the color of plural strokes corresponding to plural ruled lines of the handwritten table 601. Thereby, the visibility of the reshaping result 602 can further be enhanced.

Then, the reshaping result display process module 310 displays the display area of the handwritten table 601, in which the plural strokes corresponding to handwritten characters were deleted, and the display area of the reshaping result 602 in an at least partly overlapping manner. The reshaping result display process module 310 may display the display area of the reshaping result 602 in a manner to overlap at least a part of the display area of the handwritten table 601. In this case, the background of the reshaping result 602 is set to be transparent so that the handwritten table 601, which is located behind the reshaping result 602, may be seen through the background of the reshaping result 602.

When the "OK" button 611 on the note view screen of FIG. 16 has been operated (e.g. a tap operation) by the user, the reshaping result display process module 310 replaces the handwritten table 601 with the reshaping result 602. In this case, the handwritten table 601 is erased from the note view screen, and the display position of the reshaping result 602 is moved, where necessary, so that the reshaping result 602 may be displayed at the display position of the original handwritten table 601. On the other hand, when the "Cancel" button 612 has been operated (e.g. a tap operation) by the user, the reshaping result display process module 310 erases the reshaping result 602 from the note view screen, and restores the line kind (thickness, solid line/broken line, etc.) and the color of the plural strokes included in the handwritten table 601 to the original state. Further, the reshaping result display process module 310 displays once again the deleted strokes of handwritten characters on each cell in the handwritten table 601.

Figure 17:
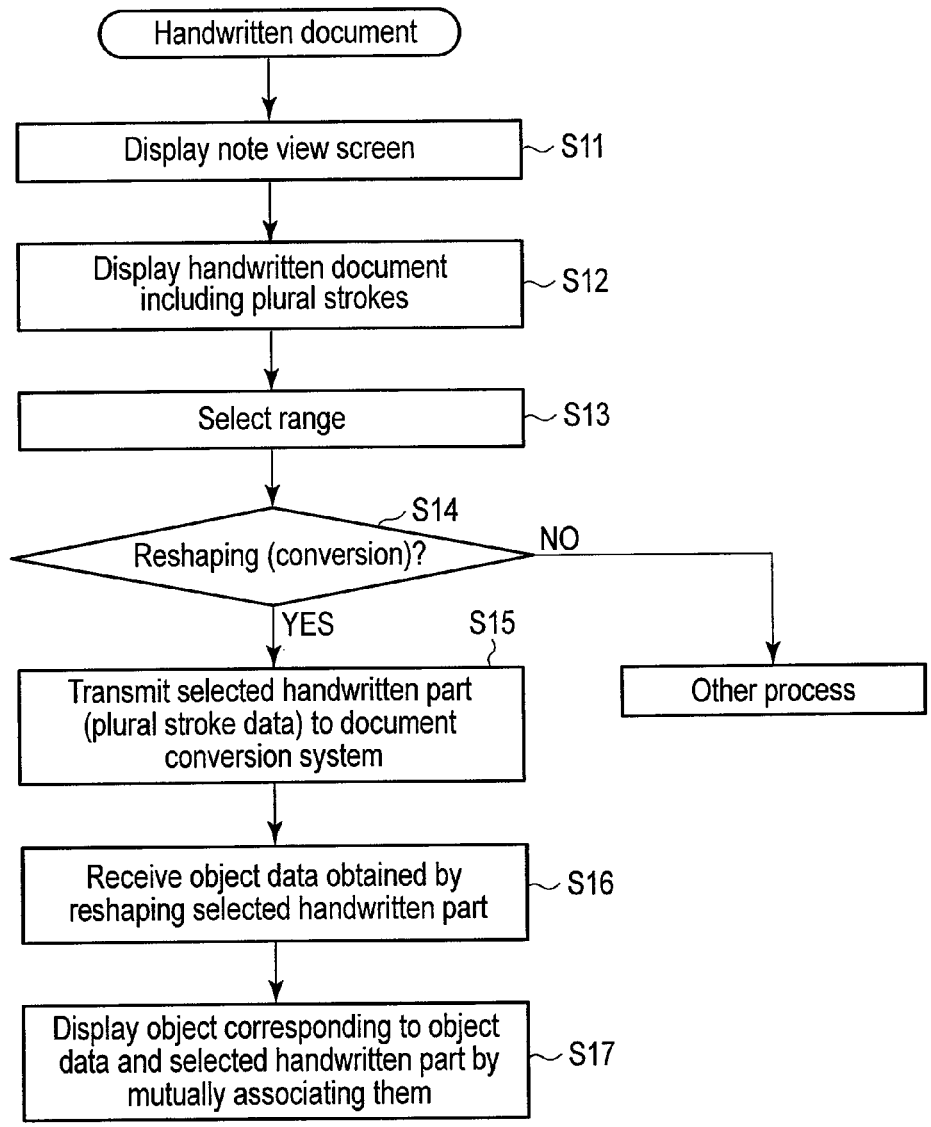
FIG. 17 is a flowchart illustrating the procedure of a handwritten document process which is executed by the electronic device of the embodiment.

A flowchart of FIG. 17 illustrates the procedure of a handwritten document process which is executed by the handwriting note application program 202.

The handwriting note application program 202 displays a note view screen (step S11). Then, the handwriting note application program 202 displays on the note view screen a handwritten document including a plurality of strokes described by handwriting (step S12). In step S12, a plurality of strokes, which constitute a handwritten document, are displayed on the note view screen. The display of the strokes may be executed, for example, based on handwritten page data which has been read out of the storage medium 402, or in accordance with a handwriting input operation on the note view screen. The handwriting note application program 202 selects from the handwritten document a handwritten part (a plurality of strokes) which is designated by a select range on the note view screen (step S13).

If execution of the reshaping function has been requested by the user (YES in step S14), the handwriting note application program 202 transmits the selected handwritten part to the document conversion system 2 (step S15). In step S15, a plurality of stroke data corresponding to a plurality of strokes included in the selected handwritten part are transmitted to the document conversion system 2.

Then, the handwriting note application program 202 receives from the document conversion system 2 a reshaping result (object data) which is obtained by reshaping the handwritten part (step S16). The handwriting note application program 202 displays the reshaping result (an object corresponding to object data) and the handwritten part on the note view screen by mutually associating the reshaping result and the handwritten part, based on the display position (display area) of the handwritten part (step S17).

In step S17, as has been described with reference to FIG. 12 and FIG. 13, based on the display position of the handwritten part, the handwriting note application program 202 may display the reshaping result in place of the handwritten part at the display position of the handwritten part. Thereby, the display content of the select range in the handwritten document is replaced with the reshaping result. Then, as has been described with reference to FIG. 13 and FIG. 14, in accordance with an operation by the user, the handwriting note application program 202 alternately changes the content, which is to be displayed in the select range in the handwritten document, between the reshaping result and the original handwritten part.

Alternatively, as has been described with reference to FIG. 15 and FIG. 16, the handwriting note application program 202 may change the line kind or the color of a plurality of strokes included in the handwritten part, and may display the display area of the handwritten part and the display area of the reshaping result in an at least partly overlapping manner.

As has been described above, in the present embodiment, the handwritten part, which is designated by the select range on the screen, is transmitted from the tablet computer 10 to the handwritten document conversion system 2. Then, the handwritten part and the reshaping result, which is received from the handwritten document conversion system 2, are displayed on the screen in a fashion in which the handwritten part and the reshaping result are associated with each other. Therefore, a desired part in the handwritten document can easily be shaped, and the reshaping result can be presented to the user in such a fashion that the user can visually compare the handwritten part before reshaping and the reshaping result.

Since the various processes on the handwritten document in the embodiment can be realized by a computer program, the same advantageous effects as with the present embodiment can easily be obtained simply by installing the computer program into an ordinary computer through a computer-readable storage medium which stores the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display processor configured to display on a screen a handwritten document including a plurality of strokes described by handwriting;
a transmitter configured to transmit to a system a handwritten part designated by a select range on the screen; and
a receiver configured to receive from the system a reshaping result corresponding to the handwritten part,
wherein the display processor is further configured to display the reshaping result on the screen, the reshaping result and the handwritten part associated with each other, and
wherein the display processor is further configured to change a line kind or a color of a plurality of strokes included in the handwritten part, and to display the reshaping result in a manner to at least partially overlap with a display area of the handwritten part.

2. The electronic device of claim 1,
wherein the display processor is configured to be able to effect switching between a first display mode in which the reshaping result, in place of the handwritten part, is displayed at a display position of the handwritten part, and a second display mode in which the handwritten part, in place of the reshaping result, is displayed at the display position.

3. The electronic device of claim 1,
wherein a display area of the reshaping result and a display area of the handwritten part are at least partly overlapped.

4. The electronic device of claim 1,
wherein a display area of the reshaping result and a display area of the handwritten part are at least partly overlapped, and
at least a part of the handwritten part is seeable through the display area of the reshaping result.

5. The electronic device of claim 1,
wherein the display processor is configured to:
when the handwritten part includes one or more strokes corresponding to a handwritten character and one or more strokes other than a handwritten character,
erase a locus of the one or more strokes corresponding to the handwritten character from the screen; and
display a display area of the reshaping result and a display area of the handwritten part in an at least partly overlapping manner.

6. The electronic device of claim 1,
wherein the display processor is configured to:
when the handwritten part includes one or more strokes corresponding to a handwritten character and one or more strokes other than a handwritten character, erase a locus of the one or more strokes corresponding to the handwritten character from the screen;
change a line kind or a color of the one or more strokes other than the handwritten character; and
display a display area of the reshaping result and a display area of the handwritten part in a partly overlapping manner.

7. The electronic device of claim 1,
wherein the transmitter is configured to transmit to the system a plurality of stroke data corresponding to a plurality of strokes included in the handwritten part.

8. A method for processing a handwritten document, comprising:
displaying on a screen a handwritten document including a plurality of strokes described by handwriting;
transmitting to a system a handwritten part corresponding to a select range on the screen;
receiving from the system a reshaping result corresponding to the handwritten part; and
changing a line kind or a color of a plurality of strokes included in the handwritten part; and
displaying the reshaping result in a manner to at least partially overlap with a display area of the handwritten part.

9. The method of claim 8, further comprising switching a display mode between a first display mode in which the reshaping result, in place of the handwritten part, is displayed at a display position of the handwritten part, and a second display mode in which the handwritten part, in place of the reshaping result, is displayed at the display position.

10. The method of claim 8,
wherein a display area of the reshaping result and a display area of the handwritten part are at least partly overlapped.

11. The method of claim 8,
wherein a display area of the reshaping result and a display area of the handwritten part are at least partly overlapped, and at least a part of the handwritten part is seeable through the display area of the reshaping result.

12. The method of claim 8, further comprising:
when the handwritten part includes one or more strokes corresponding to a handwritten character and one or more strokes other than a handwritten character,
erasing a locus of the one or more strokes corresponding to the handwritten character from the screen; and
displaying a display area of the reshaping result and a display area of the handwritten part in an at least partly overlapping manner.

13. The method of claim 8, further comprising:
when the handwritten part includes one or more strokes corresponding to a handwritten character and one or more strokes other than a handwritten character, erasing a locus of the one or more strokes corresponding to the handwritten character from the screen;
changing a line kind or a color of the one or more strokes other than the handwritten character; and
displaying a display area of the reshaping result and a display area of the handwritten part in a partly overlapping manner.

14. The method of claim 8,
wherein the transmitting comprises transmitting to the system a plurality of stroke data corresponding to a plurality of strokes included in the handwritten part.

15. A computer-readable, non-transitory storage medium having stored thereon a computer program which is executable by a computer, the computer program controlling the computer to execute functions of:
displaying on a screen a handwritten document including a plurality of strokes described by handwriting;
transmitting to a system a handwritten part designated by a select range on the screen;
receiving from the system a reshaping result corresponding to the handwritten part;
changing a line kind or a color of a plurality of strokes included in the handwritten part; and
displaying the reshaping result in a manner to at least partially overlap with a display area of the handwritten part.

16. The storage medium of claim 15,
wherein the computer program further controls the computer to execute a function of switching a display mode between a first display mode in which the reshaping result, in place of the handwritten part, is displayed at a display position of the handwritten part, and a second display mode in which the handwritten part, in place of the reshaping result, is displayed at the display position.

17. The storage medium of claim 15,
wherein a display area of the reshaping result and a display area of the handwritten part are at least partly overlapped.

18. The storage medium of claim 15,
wherein a display area of the reshaping result and a display area of the handwritten part are at least partly overlapped, and
at least a part of the handwritten part is seeable through the display area of the reshaping result.

19. The storage medium of claim 15,
wherein the computer program further controls the computer to execute functions of:
when the handwritten part includes one or more strokes corresponding to a handwritten character and one or more strokes other than a handwritten character,
erasing a locus of the one or more strokes corresponding to the handwritten character from the screen; and
displaying a display area of the reshaping result and a display area of the handwritten part in an at least partly overlapping manner.

20. The storage medium of claim 15,
wherein the computer program further controls the computer to execute functions of:
when the handwritten part includes one or more strokes corresponding to a handwritten character and one or more strokes other than a handwritten character, erasing a locus of the one or more strokes corresponding to the handwritten character from the screen;
changing a line kind or a color of the one or more strokes other than the handwritten character; and
displaying a display area of the reshaping result and a display area of the handwritten part in a partly overlapping manner.

21. The storage medium of claim 15,
wherein the transmitting comprises transmitting to the system a plurality of stroke data corresponding to a plurality of strokes included in the handwritten part.

* * * * *